(12) United States Patent
Ahlgren et al.

(10) Patent No.: US 9,410,289 B2
(45) Date of Patent: *Aug. 9, 2016

(54) COATING COLOR COMPOSITION AND PAPER OR PAPERBOARD COATED WITH IT

(75) Inventors: Jonni Ahlgren, Espoo (FI); Antti Matula, Nokia (FI); Tarja Turkki, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 636 days.

This patent is subject to a terminal disclaimer.

(21) Appl. No.: 12/493,626

(22) Filed: Jun. 29, 2009

(65) Prior Publication Data

US 2010/0159263 A1 Jun. 24, 2010

(30) Foreign Application Priority Data

Dec. 18, 2008 (FI) ..................................... 20086213

(51) Int. Cl.
| | | |
|---|---|---|
| *C09D 103/02* | (2006.01) | |
| *D21H 19/56* | (2006.01) | |
| *D21H 19/58* | (2006.01) | |
| *C09D 125/14* | (2006.01) | |
| *C09D 109/08* | (2006.01) | |
| *D21H 19/54* | (2006.01) | |
| *D21H 19/60* | (2006.01) | |
| *D21H 21/18* | (2006.01) | |
| *D21H 21/52* | (2006.01) | |

(52) U.S. Cl.
CPC .............. *D21H 19/58* (2013.01); *C09D 125/14* (2013.01); *C09D 103/02* (2013.01); *C09D 109/08* (2013.01); *D21H 19/54* (2013.01); *D21H 19/60* (2013.01); *D21H 21/18* (2013.01); *D21H 21/52* (2013.01); *Y10T 428/31906* (2015.04)

(58) Field of Classification Search
None
See application file for complete search history.

(56) References Cited

U.S. PATENT DOCUMENTS

| | | | |
|---|---|---|---|
| 4,171,407 A * | 10/1979 | Elser et al. ..................... 428/500 |
| 4,375,535 A * | 3/1983 | Kightlinger et al. .......... 527/313 |
| 4,384,069 A | 5/1983 | Wendel et al. |
| 4,567,099 A | 1/1986 | Van Gilder et al. |
| 4,835,212 A * | 5/1989 | Degen et al. .................. 524/734 |
| 5,139,614 A | 8/1992 | dePierne et al. |
| 5,776,619 A | 7/1998 | Shanton |
| 6,114,417 A | 9/2000 | O'Toole et al. |
| 6,426,381 B1 | 7/2002 | Konig et al. |
| 6,734,232 B2 | 5/2004 | Hagiopol |
| 6,803,403 B2 | 10/2004 | Ishihara |
| 6,835,767 B2 | 12/2004 | Kuhn et al. |
| 2003/0228447 A1 | 12/2003 | Letzelter |
| 2004/0023004 A1 | 2/2004 | Kimpimaki et al. |
| 2005/0261394 A1 | 11/2005 | Branston et al. |
| 2005/0266167 A1 | 12/2005 | Berube |
| 2006/0122318 A1 | 6/2006 | Jho et al. |
| 2007/0212532 A1 | 9/2007 | Krumbacher et al. |
| 2008/0097019 A1 | 4/2008 | Lee et al. |
| 2009/0139675 A1 * | 6/2009 | Stein et al. .................. 162/164.6 |
| 2009/0148608 A1 | 6/2009 | Nadeau et al. |
| 2010/0010153 A1 * | 1/2010 | Feuerhake et al. ............ 524/556 |
| 2010/0015459 A1 | 1/2010 | Tammi |
| 2010/0285324 A1 * | 11/2010 | Lennartz et al. .............. 428/514 |

FOREIGN PATENT DOCUMENTS

| | | | |
|---|---|---|---|
| EP | 1344866 A1 * | 9/2003 | |
| JP | 01-249814 | 10/1989 | |
| JP | 2006322114 | 11/2006 | |
| JP | 2006322114 A * | 11/2006 | |
| RU | 2265098 | 4/2014 | |
| WO | WO01/98588 | 12/2001 | |
| WO | 02/084028 A1 | 10/2002 | |
| WO | 03/029560 A1 | 4/2003 | |
| WO | 2004/099499 A1 | 11/2004 | |
| WO | WO 2007000419 A1 * | 1/2007 | |
| WO | 2007113121 A | 10/2007 | |

OTHER PUBLICATIONS

JP58115196 Abstract, 5 pages.
Japanese Office Action Apr. 2, 2013.
Japanese Office Action dated Mar. 25, 2014; Application No. 2011-541527; 10 pages.

* cited by examiner

*Primary Examiner* — Monique Jackson
(74) *Attorney, Agent, or Firm* — Thomas Horstemeyer, LLP

(57) ABSTRACT

The invention relates to a coating color composition for paper and/or paperboard comprising a pigment, optionally known additives used in coating compositions, and a binder substitute comprising styrene acrylate copolymer having mean particle size ≤100 nm. The invention also relates to paper or paperboard coated with a coating color composition according to the invention.

8 Claims, No Drawings

COATING COLOR COMPOSITION AND PAPER OR PAPERBOARD COATED WITH IT

CROSS REFERENCE TO RELATED APPLICATIONS

This application claims priority to Finnish Patent Application No. 20086213 filed on Dec. 18, 2008, the disclosure of which is also incorporated herein by reference.

The present invention relates to a coating color composition and to the paper or paperboard according to the preambles of the enclosed claims.

Paper and paperboard are coated with different coating colors in order to improve, among other things, their strength, printability and appearance, e.g. smoothness and gloss. Conventional coating compositions comprise mainly pigment and binder, and possible other additives, such as co-binders, preservatives, dispersing agents, defoaming agents, lubricants, hardeners and optical brighteners.

The role of binder in the coating composition is to bind the pigment particles to each other and to the base paper. They may also have an effect on the Theological properties of the coating composition. Typical synthetic binders are polymers based on butadiene, styrene, vinyl acetate, butyl acrylate and acrylic acid monomers. Such polymer dispersions are conventionally called latex binders, and they have a particle size around 0.1-0.2 µm. As the latex binders are synthetic compounds their price may be relatively high. Therefore it would be advantageous to minimize the amount of binder in the coating composition without impairing the properties of the composition and the resulting coated paper.

Styrene/acrylate copolymers as surface sizing agents are known. For example, U.S. Pat. No. 6,426,381 discloses styrene/(meth)acrylate copolymers that can be used for surface sizing.

JP 58/115196 discloses a water soluble paper strength increasing agent which is prepared by graft copolymerizing styrene and acrylate in presence of starch. The agent is said to improve the strength and sizing degree of paper.

An object of this invention is to provide a coating color composition with which the disadvantages in the prior art may be minimized or even eliminated.

An object is also to provide a coating color composition which improves the strength properties of the coated paper or paperboard.

A further object of this invention is to provide a coating color composition, where amount of the binder may be reduced without impairing the strength properties of the coated paper.

These objects are attained with a method and an arrangement having the characteristics presented below in the characterizing parts of the independent claims.

Typical coating color composition for paper and/or paperboard according to the present invention comprises
  a pigment,
  optionally known additives used in coating compositions, and
  a binder substitute comprising styrene acrylate copolymer having mean particle size ≤100 nm.

Typical paper or paperboard according to the present invention is coated with a coating color composition according the present invention.

Now it has been surprisingly found out that by using a binder substitute comprising copolymer of styrene and acrylate, which has a small well-defined particle-size, it is possible to replace all or a part of the conventional latex binder used in coating color composition and, at the same time, to obtain coated paper with improved strength characteristics. It is also possible to reduce the amount of conventional binder without any significant impairment of the strength of the coated paper. When the binder substitute is used as main binder or sole binder in the coating composition, it is possible to obtain coated paper with clearly enhanced surface strength characteristics. On the other hand, when the binder substitute is used to replace a part of the conventional binder it has been found out that the amount of the total binder may easily be reduced by 20-30% without impairment of the strength properties of the paper. Reduction of the amount of total binder naturally decreases the costs associated with it.

It is surprising that the small particle size of the styrene acrylate copolymer has such an effect on the strength properties of the resulting coated paper. It may be speculated, without being bound by the theory, that the increased surface area might be responsible for the effect.

The styrene acrylate copolymer that is used as the binder substitute may be obtained by copolymerization of ethylenically unsaturated monomers. Suitable styrene monomers are styrene and substituted styrenes, such as α-methylstyrene or vinyltoluene or their mixtures, and suitable acrylate monomers are C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate, mixture of at least two isomeric butyl acrylates being preferred, mixtures of n-butyl acrylate and methyl methacrylate being particularly preferred. According to one most preferred embodiment of the invention the mixtures of n-butyl acrylate and tert-butyl acrylate are used in polymerization. For mixtures of two monomers the mixing ratio may be 10:90 to 90:10.

Preferably the binder substitute is styrene acrylate copolymer comprising starch. The styrene acrylate copolymer may be obtained as described in U.S. Pat. No. 6,426,381, i.e. by free radical emulsion copolymerization of ethylenically unsaturated monomers in the presence of starch. Starch may be any suitable native starch, such as potato, rice, corn, waxy corn, wheat, barley or tapioca starch, potato starch being preferred. Starches having a amylopectin content >80%, preferably >95% are advantageous. Starch may be also modified, for example, anionized, cationized or degraded. Anionized starch comprises anionic groups, such as carboxylate or phosphate groups, whereas cationized starch comprises cationic groups, such as quaternized ammonium groups. Degree of substitution (DS), indicating the number of anionic/cationic groups in the starch on average per glucose unit, is typically 0.01-0.20, Amphoteric starches comprising both anionic and cationic groups, may also be used in the preparation of the styrene acrylate copolymer. Degraded starch is obtained by subjecting the starch to oxidative, thermal, acidic or enzymatic degradation, oxidative degradation being preferred. Hypochlorite, peroxodisulfate, hydrogen peroxide or their mixtures may be used as oxidizing agents. Degraded starch has typically an average molecular weight (Mn) 500-10 000, which can be determined by known gel chromatography methods. The intrinsic viscosity is typically 0.05 to 0.12 dl/g, determined, for example, by known viscosimetric methods.

According to one embodiment of the invention it is possible to use, instead of starch any other polysaccharide, which contains a free hydroxyl group, such as amylose, amylopectine, carrageen, cellulose, chitosan, chitin, dextrines, guar gum (guarane) and other galactomannans, arabic gum, hemicellulose components, and pullulan, for obtaining styrene acrylate copolymer used in the present invention. Dextrin is more preferred of the polysaccharides listed, i.e. the styrene acrylate copolymer comprises dextrin.

The binder substitute may be used in form of aqueous polymer dispersion having a solids content of 10-50%, preferably 20-50%, more preferably 21-29%, most preferably 35-40%. High solids content is advantageous as the amount of water in the coating composition may be minimized.

According to one embodiment of the invention the mean particle size of the binder substitute as an aqueous dispersion is at least 20 nm, preferably at least 25 nm, more preferably 30 nm, still more preferably 35 nm, most preferably at least 40 nm, and less than 90 nm, preferably less than 80 nm, more preferably less than 70 nm, still more preferably less than 60, most preferably less than 50 nm. Usually the mean particle size of the binder substitute is <100 nm. According to one embodiment of the invention the mean particle size of the binder substitute as an aqueous dispersion is in the range 20-100, preferably 30-80 nm, more preferably 40-70 nm, most preferably 60-70. The mean particle size of the binder substitute may be determined by photon correlation spectroscopy using for example a Malvern Zetamaster equipment.

According to one embodiment of the invention the coating composition comprises, besides binder substitute, also a latex binder. Typical synthetic latex binders that may be used in the present invention are latices known in the art, such as styrene butadiene (SB), styrene acrylate (SA) or polyvinyl acetate (PVAc) latices. Preferably the latex binder is styrene butadiene (SB) latex.

According to one embodiment of the invention the coating composition may also comprise in addition to the binder substitute and possible main binder also starch binder, which starch may be anionic or cationic.

Typical pigments that may be used in the present invention are calcium carbonate, kaolin, calcinated kaolin, talc, titanium dioxide, gypsum, chalk, satine white, barium sulfate, sodium aluminum silicate, aluminum hydroxide or any of their mixture. Calcium carbonate may be ground calcium carbonate (GCC) or precipitated calcium carbonate (PCC) or their mixture. Preferably the pigment is calcium carbonate.

In this application the composition of the coating color mixture is given, as conventional in the art, by giving the total amount of pigments value 100, and calculating the amounts of other components relative to the amount of the total pigment (pph). Proportions of all components are given as active substances.

According to one embodiment of the invention the binder substitute may be used together with conventional co-binders, such as carboxy methyl cellulose (CMC), polyvinyl alcohol (PVOH), starch, casein or protein. Amount of the co-binders in the coating composition is normally 0.05-3 parts. In case of starch, the amount of may be 0.05-12 parts, preferably 0.1-10 parts.

It is possible to add to the coating color composition according to the present invention also small amount of conventional additives in order to improve the properties or handling of the composition or in order to provide it with desired functionality. Possible additives are, for example, preservatives, dispersing agents, defoaming agents, lubricants, hardeners and optical brighteners. The amount of other additives are normally 0-3 parts.

According to one embodiment of the invention the coating color composition comprises
  100 parts of pigment,
  0-12 parts of binder, preferably latex binder,
  1.5-9 parts of binder substitute, and
  0-3 parts of known additives, provided that the total amount of binder and binder substitute is at least 5 parts.

According to another embodiment of the present invention the coating color composition comprises
  100 parts of pigment,
  4-12 parts of starch,
  3-6 parts of binder, preferably latex binder,
  2-4 parts of binder substitute, and
  0-3 parts of known additives.

According to still another embodiment of the invention the coating color comprises
  100 parts of pigment,
  4-5 parts of binder,
  2-3 parts of binder substitute, and
  0-3 parts of known additives.

The coating color according to the present invention may be prepared in conventional way, i.e. the pigment slurry is mixed with the binder substitute in dispersion form and possible other additives as added as customary. If conventional binder is used in addition to the binder substitute it is also added to the coating color composition as customary. As existing equipment and procedures may be used when using the binder substitute according to the present invention, no extensive modification of the equipment is needed.

Typically the coating color according to the present invention has a solids content of 60-74%, preferably 63-72%, more preferably 65-71% and viscosity ≤2000 mPas. Viscosities are measured by using Brookfield viscometer, type DV-II, with speed 100 rpm and using spindle 3 or 4.

According to one embodiment of the invention the coating color composition is applied on paper or paperboard surface in single or multiple coating layers. Applied coating methods include for example blade, rod, film transfer or air brush coating. Applied coat weights are typically in the range of 5-30 g/m$^2$/side. In one applied coating layer the coat weight is generally 5-16 g/m$^2$/side, more typically 6-14 g/m$^2$/side, and most typically 8-12 g/m$^2$/side.

EXAMPLES

The following non-limiting examples illustrate some embodiments of the present invention.

Preparation of the Binder Substitute Comprising Styrene Acrylate Copolymer in Presence of Anionic Starch (General Description)

Oxidatively degraded potato starch (Perfectamyl® A 4692) in amount of 67 g is dispersed in 536 g of demineralized water under constant stirring in a 2 L three-necked flask having a reflux condenser. Starch is dissolved by heating to a temperature of 85° C., whereby 20.0 g of a 1% aqueous solution of $FeSO_4 \times 7H_2O$ (0.72 mmol) and 4.0 g of 35% hydrogen peroxide are added in succession.

After 15 minutes, the starch degradation is complete. The solution comprising monomers and the initiator solution are metered in simultaneously but separately in the course of 90 min at 85° C. at constant feed rate. The monomer solution comprises 86.6 g of styrene, 43.3 g of n-butyl acrylate and 43.3 g of tert-butyl acrylate. The initiator solution comprises 4.3 g of hydrogen peroxide (35%) and 127 g of water. The polymerization is performed in nitrogen atmosphere.

10 min after the end of the metering, a further 0.7 g of tert-butyl hydroperoxide are added for subsequent activation and stirring is carried out for a further 60 min. Thereafter, cooling is effected to room temperature, and filtration is performed through a 100 μm filter. The pH is adjusted to 6 with 20% sodium hydroxide solution.

A polymer dispersion having a solids content of 24.9% and a turbidity value of A=0.380 (diluted 1:10, 660 nm) is obtained. The mean particle size, measured by Malvern Zetamaster, is 61.3 nm.

Coating Experiments

Comparative Experiment

Commercial styrene butadiene and styrene acrylate latices are tested using coating color compositions in table 1. Coating colors are prepared and diluted to 50% solids content in order to be used in laboratory coating. Paper samples are draw-down coated. Surface strength is measured with IGT-device (IGT Testing Systems). The results are summarized in table 2.

TABLE 1

Coating color composition used

| Coating color component | Parts |
| --- | --- |
| Coating grade ground calcium carbonate | 100 |
| Binder | 9 |
| Rheology modifiers | 0.7 |

TABLE 2

Coating color properties and surface strength results using normal viscosity oil.

| BINDER | SB-latex | SA-latex |
| --- | --- | --- |
| Solids (%) | 50.2 | 50.2 |
| T (° C.) | 23 | 26 |
| pH | 9.0 | 9.0 |
| $Br_{100}$ (mPas) | 89 | 88 |
| $Br_{50}$ (mPas) | 115 | 119 |
| Coat weight (g/m$^2$) | 7.9 | 7.8 |
| Average IGT-surface strength (m/s): | 0.70 | 0.73 |

The two commercial latices give similar surface strength results.

Experiment 1

Experiment is carried out in laboratory scale. Binder substitute 1 comprises styrene acrylate copolymer polymerized in presence of anionic starch and binder substitute 2 comprises styrene acrylate copolymer polymerized in presence of cationic starch. Binder substitute 1 is prepared according to the general description above. Binder substitute 1 and binder substitute 2 have solids contents 24 and 25%, respectively. Commercial styrene butadiene is used in the coating composition as main binder. Type of the binder substitute is the only variable in the coating color compositions. Coating color compositions are prepared using Diaf laboratory dissolver and diluted to 50% solids content. Coating color compositions are shown in Table 1.

TABLE 1

Coating color composition used

| Coating color component | Parts |
| --- | --- |
| Coating grade ground calcium carbonate | 100 |
| Total binder (=main binder + binder substitute) | 6-9 |
| Rheology modifiers | 0.7 |

Mixture of SB latex and a binder substitute (4.5+3 parts) is used. All tested coating color compositions have solids content of 67% and Brookfield 100 viscosity ca. 2000 mPas or lower. Static water retention values are measured using AA-GWR instrument model 4 (manufacturer: DT-paper science) using 30 seconds time and 0.3 bar pressure. Static water retention values are similar with the reference.

Use of binder substitutes gives to the coating color compositions high shear viscosity similar to the reference. Paper samples are draw-down coated. Surface strength of the coated paper samples is measured with IGT AIC2-5 device, according to standard procedure SCAN-P 63:90. The surface strength results are shown in table 2.

TABLE 2

Surface strength results

| Binder/ Composition Property | Reference composition | Composition 1 | Composition 2 |
| --- | --- | --- | --- |
| SB-latex (parts) | 9 | 4.5 | 4.5 |
| Binder substitute1 (parts) | — | 3 | — |
| Binder substitute 2 (parts) | — | — | 3 |
| Solids content (%) | 49.6 | 50.0 | 50.0 |
| Coat weight (g/m$^2$) | 10.8 | 11.0 | 10.1 |
| IGT-surface strength (m/s): | 0.86 | 0.84 | 0.80 |

It can be seen from Table 2 by using 3 parts of binder substitute the SB-latex amount can be reduced by 50% and still the coated paper samples show the same surface strength properties.

Experiment 2

Experiment is carried out by using OptiBlade coater with binder substitute 1. Base paper is pre-coated, and the applied coat weight is 11 g/m$^2$. The different binder compositions are shown in table 3. All coating color compositions contain same amounts of normal coating color additives not listed here.

TABLE 3

Test compositions with the binder substitute 1

| Composition/ Composition Property | Comp. 3 | Comp. 4 | Comp. 5 | Comp. 6 | Reference Composition |
| --- | --- | --- | --- | --- | --- |
| Coating GCC (parts) | 100 | 100 | 100 | 100 | 100 |
| SB latex (parts) | 5 | 5 | 4 | 4 | 9 |

TABLE 3-continued

Test compositions with the binder substitute 1

| Composition/<br>Composition Property | Comp. 3 | Comp. 4 | Comp. 5 | Comp. 6 | Reference<br>Composition |
|---|---|---|---|---|---|
| Binder substitute 1 (parts) | 3 | 2 | 3 | 2 | — |
| Solids content (%) | 69 | 69 | 69 | 69 | 69 |
| pH | 9 | 9 | 9 | 9 | 9 |

All the compositions are run without any problems with the coating apparatus. Blade pressures are on the same level with all compositions. The reference composition has the lowest Brookfield viscosity.

Paper samples coated with the test compositions are calendered on Optiload Twinline. Calendering speed is 800 m/min and roll temperature 120° C.

Then the coated paper samples are printed using 5-color (B,C,M,B,C) printing with constant density and speed 8000 sheets/h on Man Roland 300 printing press.

In Table 4 is given results of a visual evaluation of the printed paper samples, with the following grading: 1=very good, 2=good, 3=medium, 4=bad, 5=very bad.

TABLE 4

Visual evaluation of the printed samples

| Sample name | Evaluation |
|---|---|
| Reference Sample | 2 |
| Comp. 3 | 3 |
| Comp. 4 | 2 |
| Comp. 5 | 1.5 |
| Comp. 6 | 3.5 |

Piling and picking of the paper samples were also analyzed and the results are shown in table 5. The grading is following: 0=good; 1-3=comfortable; 4=bad; 5=very bad. All the coated paper samples had good piling resistance and comfortable picking properties. Runnability was also good with all samples.

TABLE 5

Piling and picking results at 20° C.

| Sample name | No of printed sheets | PILING 0-5 Unit | | | | | PICKING 0-5 | RUNNABILITY Feeder 0-5 | Delivery 0-5 |
|---|---|---|---|---|---|---|---|---|---|
| | | 1 | 2 | 3 | 4 | 5 | | | |
| Reference | 2000 | 0 | 0 | 0 | 0 | 0 | 1 | 0 | 0 |
| Comp. 3 | 1900 | 0 | 0 | 0 | 0 | 0 | 2 | 0 | 0 |
| Comp. 4 | 2000 | 0 | 1 | 0 | 0 | 0 | 1 | 0 | 0 |
| Comp. 5 | 2000 | 0 | 1 | 0 | 0 | 0 | 2 | 0 | 0 |
| Comp. 6 | 2000 | 0 | 0 | 0 | 0 | 0 | 3 | 0 | 0 |

The printed paper samples are analyzed and the average results from the pilot printing are summarized in table 6.

TABLE 6

Summary of the printing tests

| | Difference between the reference and compositions | | | | Significant difference |
|---|---|---|---|---|---|
| Property | Comp. 3 | Comp. 4 | Comp. 5 | Comp. 6 | |
| Gloss, print (%) | 0.0 | −0.2 | 0.0 | −1.0 | 4 |
| Gloss, paper (%) | −1.7 | 0.4 | −0.2 | −0.2 | 4 |
| Smoothness, paper, [μm] | 0.08 | 0.03 | 0.07 | 0.03 | −0.3 |
| Set-off, 30 s | 1.06 | −0.06 | −2.38 | −3.93 | −3 |
| Rub-off, 1 h | 0.21 | 0.01 | 0.17 | 0.57 | 4 |
| Mottling, 2.C50%/3.M50% | 11 | 10 | −2 | 13 | −20 |
| Mottling, 2.C100% | 9 | −3 | 5 | −1 | −50 |

The results show that in print and paper gloss, smoothness, rub-off and mottling on C50%, M50% and C100% the differences between the reference sample and samples comprising binder substitute 1 are not significant. The sample with the lowest total binder content comprising 4 parts SB latex and 2 parts binder substituent 1 is significantly faster than the reference sample in the set-off test.

IGT surface strength results on machine direction (MD) and cross direction (CD) are summarized in table 7.

TABLE 7

Surface strength results using IGT

| IGT-surface strength (m/s): | Sample name | | | | |
|---|---|---|---|---|---|
| | Comp. 3 | Comp. 4 | Comp. 5 | Comp. 6 | Ref. |
| MD average | 1.73 | 1.74 | 1.64 | 1.57 | 1.81 |
| CD average | 1.13 | 1.06 | 1.12 | 1.03 | 1.02 |
| Average (MD + CD) | 1.43 | 1.40 | 1.38 | 1.30 | 1.42 |

It can be seen from the results that the reducing of the total amount of the synthetic binder content down from 9 to 6 parts gave still acceptable printing results.

Experiment 3

Compatibility of the binder substitutes with starch is tested. Laboratory tests are carried out with binder substitutes 1 and 2, the binder substitute 1 comprising styrene acrylate copolymer polymerized in presence of cationic starch and binder substitute 2 comprising styrene acrylate copolymer polymerized in presence of anionic starch. Binder substitute 1 has solids content of 24%, and binder substitute 2 has solids content of 25%. The used coating color recipe is shown in table 8.

TABLE 8

Starch containing coating color composition

| Component | Parts |
|---|---|
| Coating grade ground (GCC) calcium carbonate | 100 |
| Co binder (Starch) | 10 |
| Total synthetic binder (=main binder + binder substitute) | 5-7 |

The coating color composition test results are summarized in Table 9. Composition A comprised binder substitute 1 and composition B binder composition 2.

TABLE 9

Properties of the coating color compositions comprising starch and binder substitute.

| | Ref. Sample | Comp. A | Comp. B |
|---|---|---|---|
| SB latex content | 7 | 3 | 3 |
| Binder substitute content | — | 2 | 2 |
| Total binder content (pph) | 7 | 5 | 5 |
| Binder substitute solids content (%) | — | 24 | 25 |
| Coating color solids content (%) | 65.3 | 64.8 | 64.1 |
| T (° C.) | 32 | 31 | 31 |
| pH | 9.0 | 9.0 | 9.0 |
| $Br_{100}$ (mPas) | 614 | 586 | 930 |
| $Br_{50}$ (mPas) | 900 | 820 | 1380 |
| WR (g/m$^2$) | 67.7 | 50.3 | 54.5 |

Binder substitute 1 gives similar viscosity to coating color composition than the SB latex used as reference. Coating color composition comprising binder substitute 2 has higher viscosity value than the reference. The reference color has the lowest high shear viscosity. Binder substitute 1 gives lower viscosity to the coating color composition than binder substitute 2. All viscosity values are good or acceptable for the tested coating compositions It can be also seen from table 9 that the static water retention (WR) values are better for the coating compositions according to the present invention than for the reference composition.

Paper samples are draw-down coated with the tested coating compositions. The surface strength is determined, and the results are presented in table 10.

TABLE 10

IGT-Surface strength of coating color compositions comprising starch and binder substitute measured with medium viscosity oil

| | Ref. | Comp. A | Comp. B |
|---|---|---|---|
| Total binder content (parts) | 7 | 5 (3 + 2) | 5 (3 + 2) |
| Solids content (%) | 50.0 | 50.0 | 50.0 |
| Coat weight (g/m$^2$) | 11.5 | 11.1 | 11.1 |
| Surface strength (m/s): | 1.09 | 0.97 | 1.17 |

The tested coating color compositions show similar surface strengths.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. An aqueous color composition for paper and/or paperboard having a solids content of 60-74 wt. % and consisting of:
   a pigment selected from the group consisting of calcium carbonate, kaolin, calcinated kaolin, talc, titanium dioxide, gypsum, chalk, satine white, barium sulphate, sodium aluminium silicate, aluminium hydroxide and any mixture thereof,
   optionally starch and/or known additives used in coating compositions selected from the group consisting of preservatives, dispersing agents, defoaming agents, lubricants, hardeners, optical brighteners, and a combination thereof,- optionally a latex binder selected from the group consisting of styrene butadiene (SB), styrene acrylate (SA), polyvinyl acetate (PVAc) latex, and any combination thereof,
   a binder substitute, wherein the binder substitute is a styrene acrylate copolymer comprising a starch having a mean particle size less than 80 nm and obtained by copolymerization of ethylenically unsaturated monomer in the presence of a starch having an amylopectin content >80 wt. % and an intrinsic viscosity from 0.05 to 0.12 dl/g, and
   water.

2. The coating color composition according to claim 1, wherein the mean particle size of the binder substitute is 40-70 nm.

3. The coating color composition according to claim 1, wherein the latex binder is styrene butadiene latex.

4. The coating color composition according to claim 1, wherein an amount of the pigment, latex binder, binder substitute and known additives is as follows:
   100 parts of total pigment,
   greater than 0 to 12 parts of the latex binder,
   1.5- 9 parts of the binder substitute, and
   0- 3 parts of known additives, provided that a total amount of the latex binder and the binder substitute is at least 5 parts.

5. The coating color composition according to claim 1, wherein an amount of the pigment, starch, latex binder, styrene binder substitute and known additives is as follows :
   100 parts of total pigment,
   4- 12 parts of starch,
   3- 6 parts of the latex binder,
   2- 4 parts of the styrene binder substitute, and
   0- 3 parts of known additives.

6. The coating color composition according to claim 1, wherein an amount of the pigment, latex binder, binder substitute and known additives is as follows :
   100 parts of total pigment,
   4- 5 parts of the latex binder,
   2- 3 parts of the binder substitute, and
   0- 3 parts of known additives.

7. The coating color composition according to claim 1, wherein the coating color composition has a solids content of 63-72 wt. %.

8. Paper or paperboard coated with a coating color composition according to claim 1.

* * * * *